United States Patent
Sharp

(10) Patent No.: US 12,323,086 B2
(45) Date of Patent: Jun. 3, 2025

(54) MOBILE SOLAR PANEL UNIT

(71) Applicant: Ecoquip Australia Pty Ltd, Henderson (AU)

(72) Inventor: David James Sharp, Henderson (AU)

(73) Assignee: Ecoquip Australia Pty Ltd, Henderson (AU)

( * ) Notice: Subject to any disclaimer, the term of this patent is extended or adjusted under 35 U.S.C. 154(b) by 105 days.

(21) Appl. No.: 17/786,411

(22) PCT Filed: Dec. 15, 2020

(86) PCT No.: PCT/AU2020/051371
§ 371 (c)(1),
(2) Date: Jun. 16, 2022

(87) PCT Pub. No.: WO2021/119733
PCT Pub. Date: Jun. 24, 2021

(65) Prior Publication Data
US 2023/0308041 A1 Sep. 28, 2023

(30) Foreign Application Priority Data
Dec. 20, 2019 (AU) .............................. 2019904880

(51) Int. Cl.
*H02S 10/40* (2014.01)
*H02S 30/20* (2014.01)

(52) U.S. Cl.
CPC .............. *H02S 10/40* (2014.12); *H02S 30/20* (2014.12)

(58) Field of Classification Search
CPC .......... H02S 10/40; H02S 30/20; H02S 40/10; H02S 30/10; F24S 2030/16; F24S 20/50; F24S 30/00; F24S 2030/18; Y02E 10/50
See application file for complete search history.

(56) References Cited

U.S. PATENT DOCUMENTS 5,785,280 A 7/1998 Baghdasarian
5,969,501 A 10/1999 Glidden et al.
(Continued)

FOREIGN PATENT DOCUMENTS

CN 203491963 3/2014
CN 204206099 3/2015
(Continued)

OTHER PUBLICATIONS

Valiant "Solar Power Trailer VTS900A", accessed at "https://web.archive.org/web/20170308172750/https://valiantsolarpower.com/products/solar-trailer/solar-power-trailer-vts900a.html" (Year: 2017).*
(Continued)

*Primary Examiner* — Angelo Trivisonno
(74) *Attorney, Agent, or Firm* — Hanley, Flight & Zimmerman, LLC

(57) ABSTRACT

A mobile solar panel unit (10) comprising:
(a) a transport device (10) having a load zone (20) having a cross sectional area; and
(b) an assembly (30) of a plurality of inter-connected solar collector panels (40, 42, 44) for providing, in use, power to an associated equipment item (70); wherein adjacent panels (40, 42; 42, 44) in said assembly (30) of solar collector panels (40, 42, 44) are inter-connected by rotatable connection means (50, 50a) for rotating panels (40, 44) allowing both storage of said assembly (30) of inter-connected solar collector panels (40, 42; 42, 44) in said load zone (20) and deployment of said assembly (30) of inter-connected solar collector panels (40, 42, 44) to a collection position to generate power when exposed to sunlight.

20 Claims, 14 Drawing Sheets

(56) References Cited

U.S. PATENT DOCUMENTS

| | | | |
|---|---|---|---|
| 7,492,120 B2 | 2/2009 | Benn et al. | |
| 8,915,474 B1 | 12/2014 | Baghdasarian et al. | |
| 2005/0092356 A1 | 5/2005 | Sakai | |
| 2005/0231157 A1* | 10/2005 | Sanders | B60L 55/00 320/109 |
| 2011/0036344 A1 | 2/2011 | Jain | |
| 2012/0020084 A1* | 1/2012 | Romero Lampon | H02S 10/40 136/245 |
| 2012/0073885 A1 | 3/2012 | Glynn | |
| 2012/0112640 A1 | 5/2012 | Maxik et al. | |
| 2012/0206087 A1 | 8/2012 | Carpoff | |
| 2012/0243214 A1 | 9/2012 | Richmond | |
| 2012/0291847 A1* | 11/2012 | Rowe, Jr. | H02S 30/20 320/101 |
| 2015/0021990 A1 | 1/2015 | Myer et al. | |
| 2017/0332199 A1 | 11/2017 | Elliott et al. | |

FOREIGN PATENT DOCUMENTS

| | | | | |
|---|---|---|---|---|
| CN | 104831658 | | 8/2016 | |
| CN | 110304273 | | 10/2019 | |
| CN | 209667396 | | 11/2019 | |
| DE | 3215431 | | 10/1983 | |
| EP | 1528255 | | 5/2005 | |
| EP | 1613861 | | 7/2012 | |
| WO | 2004090327 | | 10/2004 | |
| WO | 2007039732 | | 4/2007 | |
| WO | 2014209420 | | 12/2014 | |
| WO | WO-2014209420 A1 * | 12/2014 | | F24J 2/541 |
| WO | 2017068413 | | 4/2017 | |
| WO | WO-2017165913 A1 * | 10/2017 | | |
| WO | 2017200627 | | 11/2017 | |

OTHER PUBLICATIONS

International Searching Authority, "International Preliminary Report on Patentability," issued in connection with International Application No. PCT/AU2020/051371, issued May 17, 2022, 8 pages.

International Searching Authority, "International Search Report" issued in connection with International Application No. PCT/AU2020/051371, issued on Feb. 22, 2021, 8 Pages.

International Searching Authority, "Written Opinion" issued in connection with International Application No. PCT/AU2020/051371, issued on Feb. 22, 2021, 7 Pages.

* cited by examiner

SECTION A-A

MOBILE SOLAR PANEL UNIT

RELATED APPLICATION

This patent arises from the U.S. national stage of International Patent Application Serial No. PCT/AU2020/051371, having an international filing date of Dec. 15, 2020, which is hereby incorporated by reference in its entirety. Further, this application claims priority from Australian Provisional Patent Application No. 2019904880, the contents of which are hereby incorporated herein by reference.

TECHNICAL FIELD

This invention relates to a mobile solar panel unit which may enable solar power to be supplied to an equipment item, such as a communications antenna or light mast, in an off-grid location.

BACKGROUND ART

The following discussion of the background art is intended to facilitate an understanding of the present invention only. The discussion is not an acknowledgement or admission that any of the material referred to is or was part of the common general knowledge as at the priority date of the application.

Supplying power to an off-grid location may appear to be a straightforward matter, especially in locations benefiting from high sunlight or high wind speeds, both being recognised sources of renewable power. However, the task is more challenging than it first appears. While solar panels, for example, may be transported to a required location—assuming the presence of road infrastructure and/or a sufficiently rugged transport device—power must still be generated efficiently and at the correct voltage. This requires a sufficient solar panel area which may be quite large, requiring deployment—desirably by a single operator—of a plurality of solar collector panels (such as PV cell panels) which are interconnected to form an assembly. When deployed, the solar collector panels typically have a cross-sectional area greater than the transport device. As a consequence, the force to be applied by an operator to deploy the assembly of solar panels is typically greater than 20 kg, above acceptable limits for ease of operation by a single person in field operation.

Adding to the challenge is the need, for example in mining and construction environments, to deploy solar panels rapidly and in short time frames, again ideally by a single person. There may also be a need to quickly stow the solar panels and then move the equipment and the solar panel assembly to a new location, for example as a mining or construction project proceeds. For example, during construction of a road, lighting may be required along a stretch of road as it is constructed. This lighting may be provided by light masts powered by mobile solar panel units. Once constructed, lighting is needed on perhaps a new stretch of road under construction, the solar panel assembly is stored and moved to the new location. The deployment mechanism also needs to be robust to ensure reliable deployment and stowage in remote harsh environments.

This background raises a number of potential problems. First, the transport device—for example a trailer or other land vehicle (though not limited to trailers or land vehicles, for example barge or pontoon mounting might be required for certain applications on or in watercourses)—must be sufficiently rugged for the application. This includes durability and endurance during transit as well as endurance to environmental conditions, including climactic conditions, over the potentially long period the solar panel unit must stay in place to provide power to the required application.

Second, the transport device must allow transportation of solar or photovoltaic (PV) panels—collectively solar panels or solar collector panels—of sufficient area for the desired application. While compromises may have been tolerated in the past, the object is to avoid mis-alignment between solar/FV panel area and power required for a particular application. This may require stowage of panels on the transport device and the solar panels must be stored on the transport device in a manner that prevents damage during transit, including through dirt, rocks, water and so on interfering with the solar panel assembly mechanism and/or impacting the working or collector surfaces of the panels—i.e. the outward facing surfaces of the panels which collect solar energy for conversion into electric power for the associated equipment item. One previous option involves stowage of panels and movement between stowed and available positions using slider mechanisms. Such mechanisms are complex and subject to damage by impact and entry of other detritus into the slider mechanisms which are difficult to dustproof.

Third, for optimum efficiency, the solar or PV panels should be deployed, in an angled orientation—desirably at an ideal or near ideal angle (which is approximately the same as the geographic latitude of the deployment location and either facing north (if deployed in the southern hemisphere) or south (if deployed in the northern hemisphere)—to a horizontal plane to maximise collection of sunlight and utilisation of the panels. A flat or flat-top deployment of the panels is not optimal (other than at or near the Equator). A further benefit of an angled orientation when deploying the panels is reduction of the amount of dust, dirt or debris that can accumulate on top of the collector surface. If deployed flat, dust and dirt could easily accumulate reducing the solar panel capacity to absorb the sunlight. Given the transport problem, it is not desirable to have a greater panel area than required to meet the power requirements of the associated equipment item simply to compensate for deployment inefficiencies. This poses challenges in terms of minimising required personnel (ideally one person) to correctly deploy the panels and design of the deployment means to achieve the objectives of efficient solar collection. Again, slider mechanisms have been used for panel deployment as well. However, the requirement for slider mechanisms to have panels deployed in different, but overlapping, planes has led to shadowing effects, especially at low solar elevation such as in the early morning or late afternoon, which reduces panel efficiency.

SUMMARY OF INVENTION

This invention seeks to address, in particular, the second and third problems of successful transit and convenient and efficient deployment of solar or PV panels, solar collector panels, where used to supply power to an associated equipment item:

The present invention provides, in one aspect, a mobile solar panel unit comprising:
 (a) a transport device having a load zone having a cross-sectional area; and
 (b) an assembly of a plurality of inter-connected solar collector panels for providing, in use, power to an associated equipment item;

wherein said assembly of solar collector panels is interconnected by rotatable connection means for rotating panels allowing both storage of said assembly of inter-connected solar collector panels in said load zone and deployment of said assembly of inter-connected solar collector panels to a collection position when exposed to sunlight. The mobile solar panel unit is intended for terrestrial use, in most cases for use on land though the mobile solar panel unit could be mounted over water on a platform, pontoon, barge or similar movable device or structure.

The mobile solar panel unit load zone conveniently forms a support for the solar collector panel assembly whether in storage or deployed position. Preferably, the solar collector panel assembly remains connected with the load zone whether in stored or deployed position. Further, the solar collector panel assembly preferably has a fixed position once deployed. It is convenient to omit adjustment structure that allows, whilst the solar collector panel assembly has a fixed geographic position, movement of a deployed panel assembly to an optimal angular position as the position of the sun changes. While this is a compromise at one level, it also saves the cost of a potentially complex adjustment mechanism and provides a more rugged mobile solar panel unit as adjustment mechanisms are more subject to damage by dirt, dust and so on.

Conveniently, the connection means is a hinge connection means which may, for example, inter-connect adjacent solar collector panels of the assembly of inter-connected solar collector panels. A plurality of hinges, preferably a pair of hinges, may connect each adjacent solar collector panel to allow the solar collector panel assembly to allow the assembly to be opened for deployment and closed for storage, whether for transportation or for other reasons, for example to prevent damage during severe climactic events.

The hinge connection means, advantageously provided for manual operation by an operator in the field, advantageously includes a spring assist mechanism, or balancing spring(s), such as spiral spring(s), which—through augmentation by spring force—act to minimise effort required by an operator, in previous units, to deploy solar collector panels and provide a counter-balance to the weight of solar panel(s) amongst other advantages. Where each panel has opposing sides, at least one balancing spring is desirably connected to at least one of the opposing sides of each panel. One spring may be loaded in a closed position, subsequently assisting an operator to open the panel by using the spring effort, with the other spring loaded in an open position, subsequently assisting the operator to close the panel. More preferably, a plurality of balancing springs is provided at each hinge connection means to interconnect adjacent panels of the assembly to increase spring effort and further reduce force required by an operator to move the panels of the assembly.

The balancing spring(s) are desirably configured to allow controlled manual movement of the panels in relation to each other. A motorised movement is possible but not preferred due to cost, risk and control issues associated with providing solar collector panel servo motors as part of the mobile solar panel unit. For example, if the panel is being manually moved into position by an operator, it may be released or let go while remaining in a controlled state, a controlled state being one in which balancing springs—and more particularly the opposed balancing springs described above—would load up or slow the movement of a panel (of the assembly of solar collector panels) at either end of its travel between storage and deployed positions and vice versa. With a preferred balancing spring configuration, an operator would only have to apply a small force, say 3 kg, to fully open or close a panel. This would be desirable for single person deployment of the solar collector panel assembly, for example in windy conditions.

The assembly desirably includes locking means, such as locking pins, to secure panels into either a storage or deployed position, such locking means acting against spring force from balancing springs loaded in an opposite direction of travel as well as other forces that could move the panels. A set of locking pins, such as a pair of locking pins, may be provided for each panel and moved between a locked and unlocked position, and vice versa, to allow safe and efficient deployment. To further assist an operator of the solar panel assembly, the locking pins may operate automatically, "clicking" into place as required. One member of the locking pin set may be locking allowing the operator to release the pin from the locked position to the unlocked position and leave the pin unlocked whilst operating another member of the locking pin set. The other member of the locking pin set may be non-locking allowing it to be physically held in the unlocked position to release a panel allowing it to be opened.

The solar collector panel assembly is not intended to include a large number of panels. The number of panels is constrained by the transport device and a satisfactory and convenient number of panels, without placing an absolute limitation on panel number, has been found to be three panels.

The associated equipment item may be selected from a range of possible equipment items. In particular, though without limitation, suitable equipment items may be a light mast, for example provided with LED luminaires, or communications tower. The associated equipment item may also be stowed in the transport device and deployed on reaching the desired location. A telescopic construction for the associated equipment item, for example a light mast, also allows convenient deployment on reaching site.

BRIEF DESCRIPTION OF THE DRAWINGS

Further features of the mobile solar panel unit of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
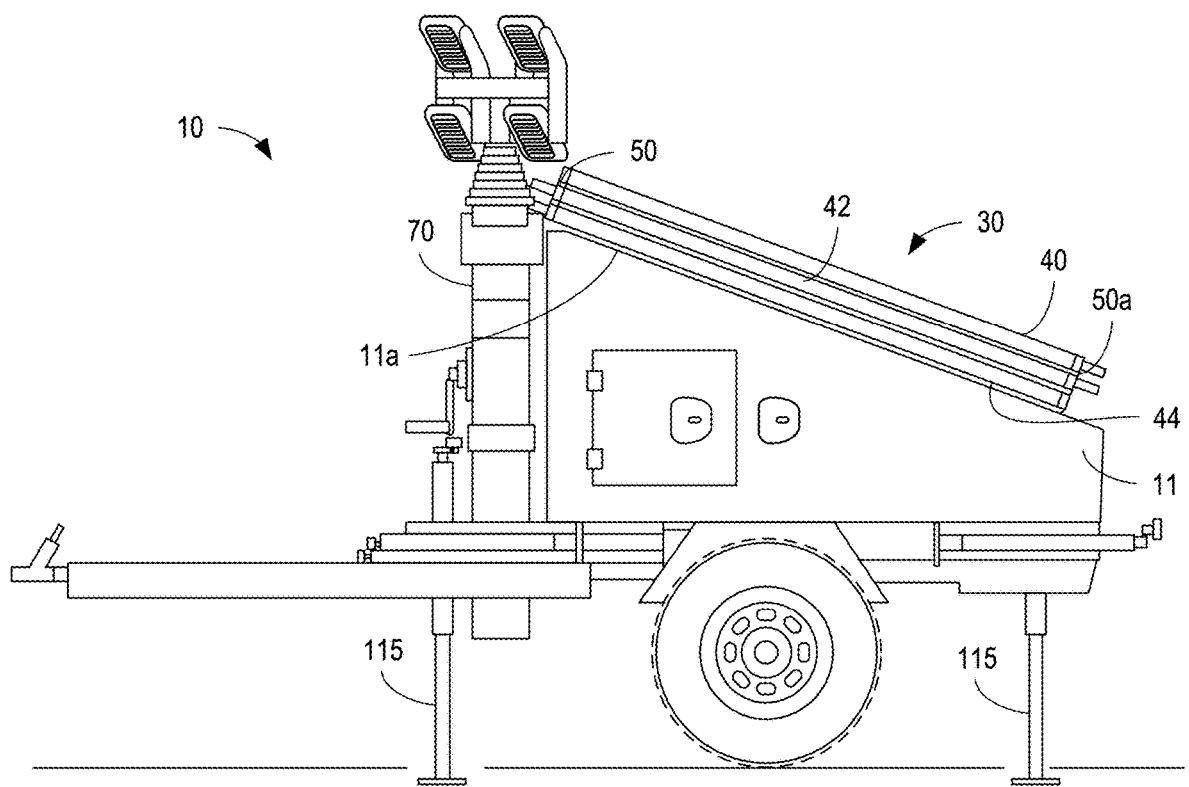
FIG. 1 is a schematic side view of a mobile solar panel unit according to one embodiment of the present invention showing an assembly of solar collector panels in stowed position.

Referring to FIGS. 1 to 7, there is shown a mobile solar panel unit 10, in the form of a trailer operated by a single operator, with a load or storage zone 20 neatly accommodating an assembly of three inter-connected solar collector panels 40, 42 and 44 for providing power for a light mast 70. Solar collector panels 40, 42 and 44 are further described below. Trailer 10 is otherwise of conventional design and is not further described here in detail familiar to the person skilled in the art of trailer design and manufacture.

Storage zone 20 includes an inclined surface 11a of a housing 11 of trailer 10 to which assembly 30 is mounted through mounting block 47. The angle of inclination of surface 11a at about 30 degrees is the same as the angle at which the solar collector panels 40, 42 and 44 will be deployed when in use to collect solar energy and convert this to electrical power. When assembly 30 is in deployed position, panels will remain at the selected angle without automatic adjustment for optimal positioning with the transit of the sun during the day. The assembly 30 has a fixed position.

Figure 14:
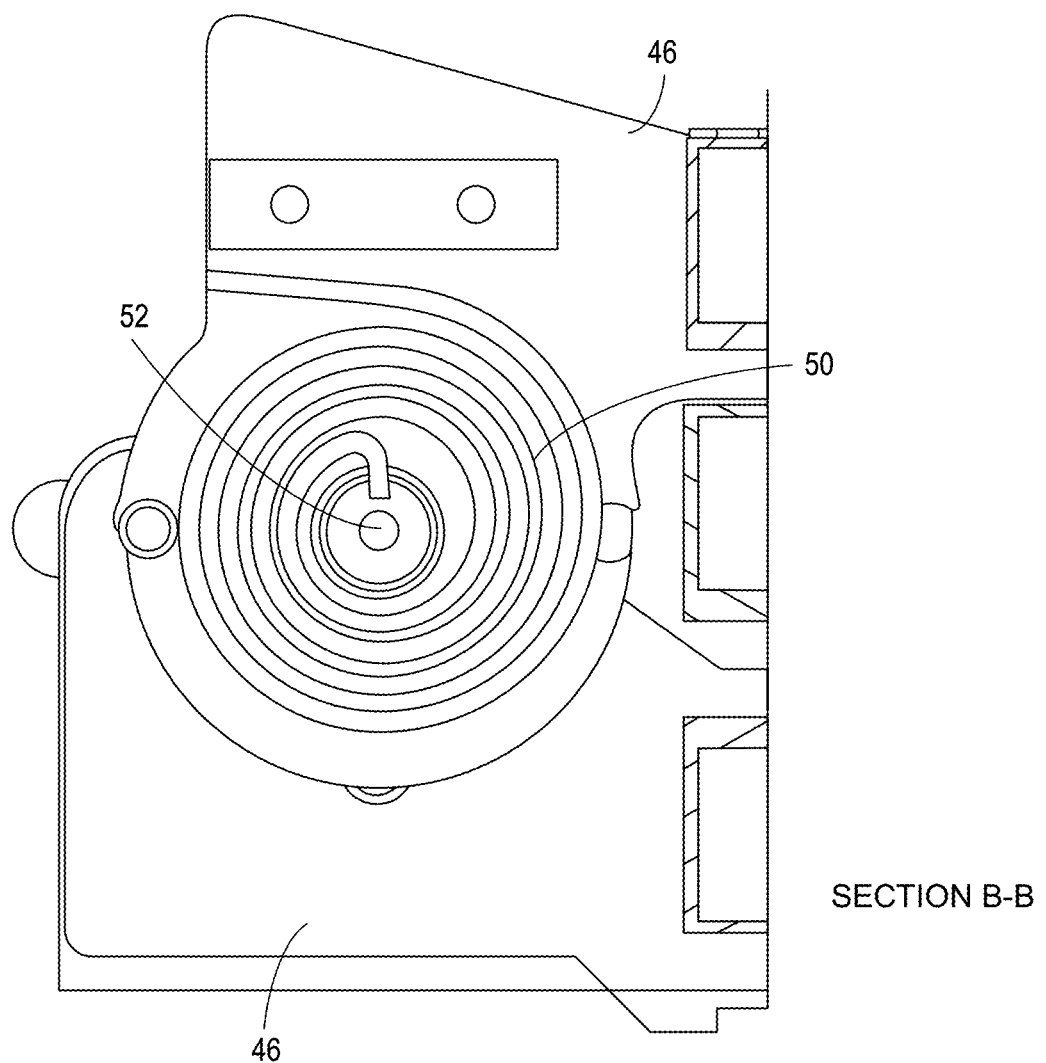
FIG. 14 is a side section view of a hinge connecting panels of the assembly of FIG. 11 along section B-B of FIG. 13.

Solar collector or solar panels 40, 42 and 44 are generally similar in design being rectangular and having opposed sides. Solar panel 42 is the middle panel as shown in FIGS. 3, 8 to 10 and 11 and is connected to each of solar panels 40 and 44 by hinge connection means including a spring assist mechanism including a pair of opposed balancing springs 50, 50a connected at the corners of the adjacent solar panels 40, 42, 44 and on the opposing sides 42a and 42b of solar panel 42. Those balancing springs designated 50 are top springs and those balancing springs designated 50a are bottom springs. The balancing springs 50, 50a, a bottom spring 50a being illustratively shown in section in FIG. 14, are flat spiral springs, mounted with respective bushes (not shown) about an axle 52 (which forms the hinge), which act in a manner similar to a watch or clock spring. Though only one balancing spring 50, 50a is shown at each hinge for ease of illustration, a pair of balancing springs 50, 50a are mounted as a stack to each axle 52.

The spring force of each balancing spring 50, 50a is selected to reduce manual effort required by an operator to either store or deploy the solar panel assembly 30 according to desirable practice. The spring force is desirably below 5 kg. In this regard, manual operation is implemented, this also having the advantage of avoiding wear or other technical issues arising from electric motor actuation though such is not precluded altogether. The use of respective pairs of balancing springs assists to reduce the force further than if a single balancing spring 50 were used at each corner connection. Balancing springs 50, 50a are opposing, so— when a panel is stowed or closed, the bottom balancing springs 50a are under tension with the top balancing springs 40 free. If a solar panel 40 or 44 is rotated to 90 degrees, both the top and bottom balancing springs 50, 50a are free or under no tension in a "neutral" position which can be convenient for cleaning and dust/water run-off when washing the two solar panels 40 or 44 during service. In this neutral position, and any other position for that matter, the balancing springs 50, 50a have forces balanced to prevent sudden movement which would create a hazard so that, even if released or let go by an operator, the solar collector panels 40, 44 will either stay in position or move only a small distance from the position in which the panels were released.

Balancing springs 50, 50a are each mounted to side members 46 of solar collector panels 40, 42 and 44, and on the axles 52 (hinges) as above described, which act as spring loaded hinges allowing rotation of solar collector panels 40 and 44 relative to solar collector panel 42. Side members 46 of solar collector panels 40 and 44 also include handles 48 to assist an operator to rotate solar collector panels 40 and 44 relative to solar collector panel 42.

Operation of the solar trailer 10 to supply power to light mast 70 will now be described.

Trailer 10 is towed by a suitable vehicle (not shown) to the required location for the light mast 70. The light mast 70 forms part of trailer 10 and is moved to a required height through a telescopic mechanism (not shown). The solar panel assembly 30 is closed or in storage position during transit, storage position being shown in FIGS. 1, 2, 8 and 13. When in the desired position at the required location, the trailer 10 is secured into position using stays 115, as shown in FIGS. 1 to 7.

Figure 2:
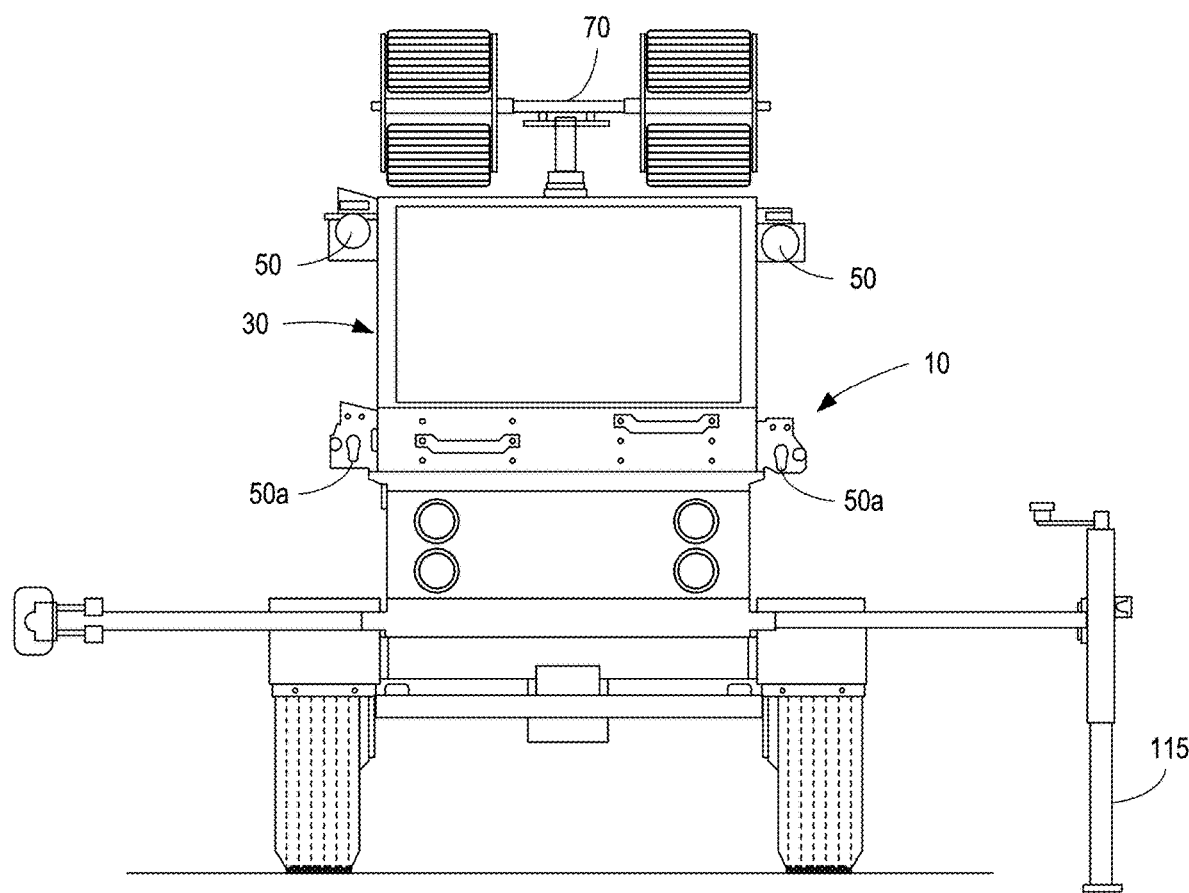
FIG. 2 is a schematic front view of the mobile solar panel unit of FIG. 1 with an assembly of solar collector panels in stowed position.
Figure 3:
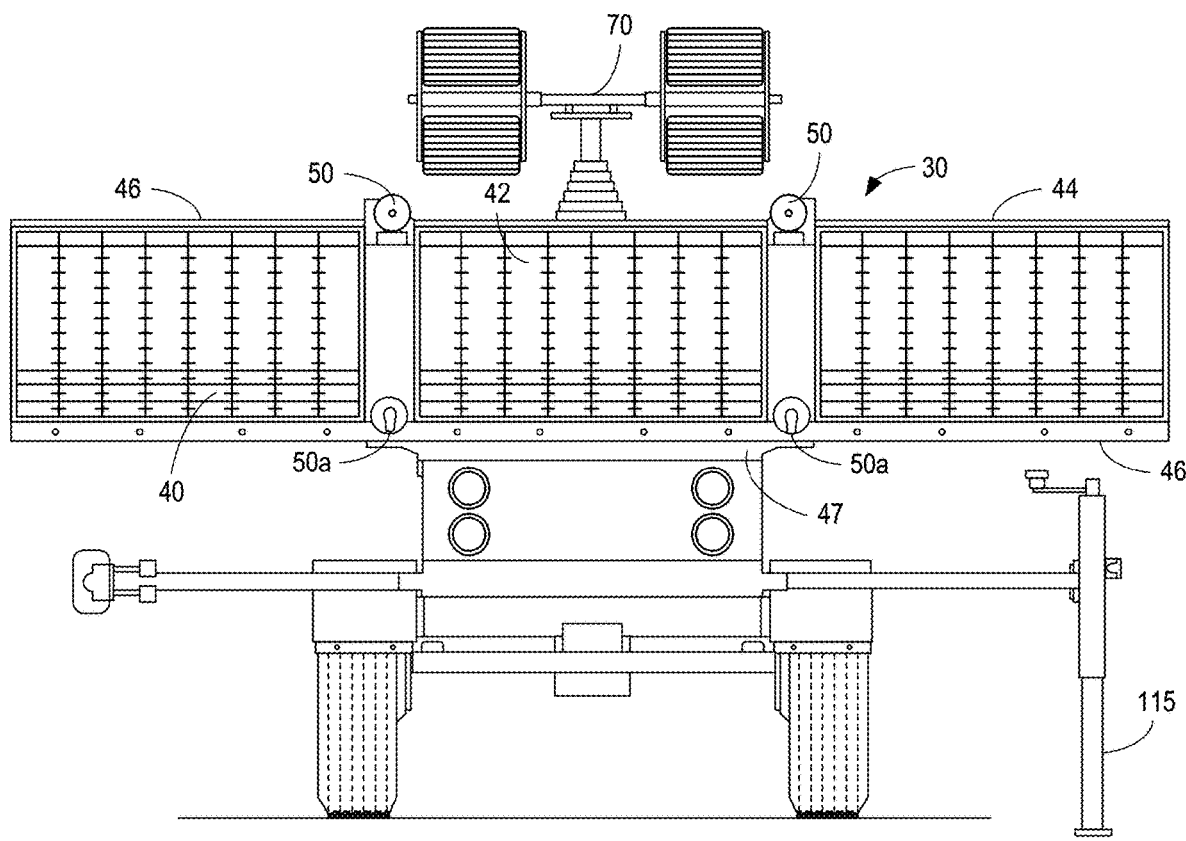
FIG. 3 is a schematic front view of the mobile solar panel unit of FIGS. 1 and 2 with an assembly of solar collector panels in deployed position.
Figure 4:
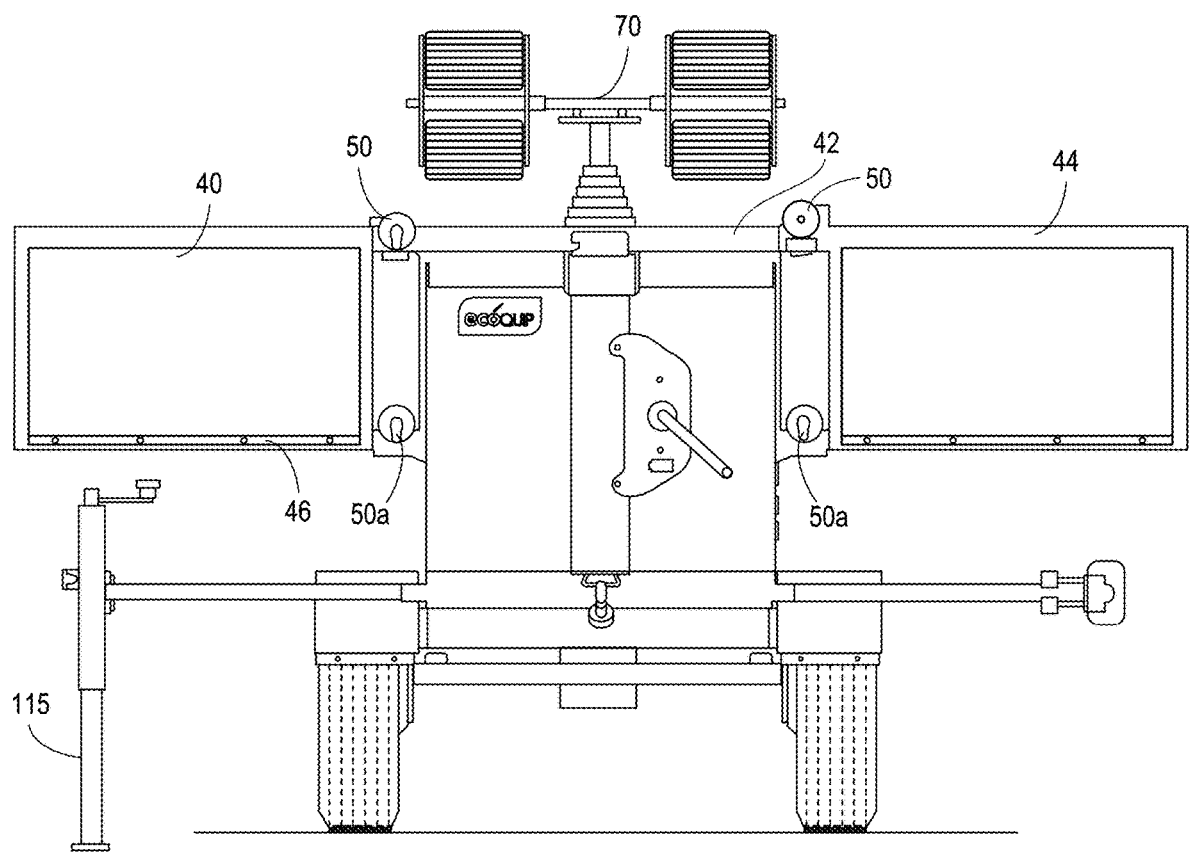
FIG. 4 is a schematic rear view of the mobile solar panel unit of FIGS. 1 to 3 with an assembly of solar collector panels in deployed position.
Figure 5:
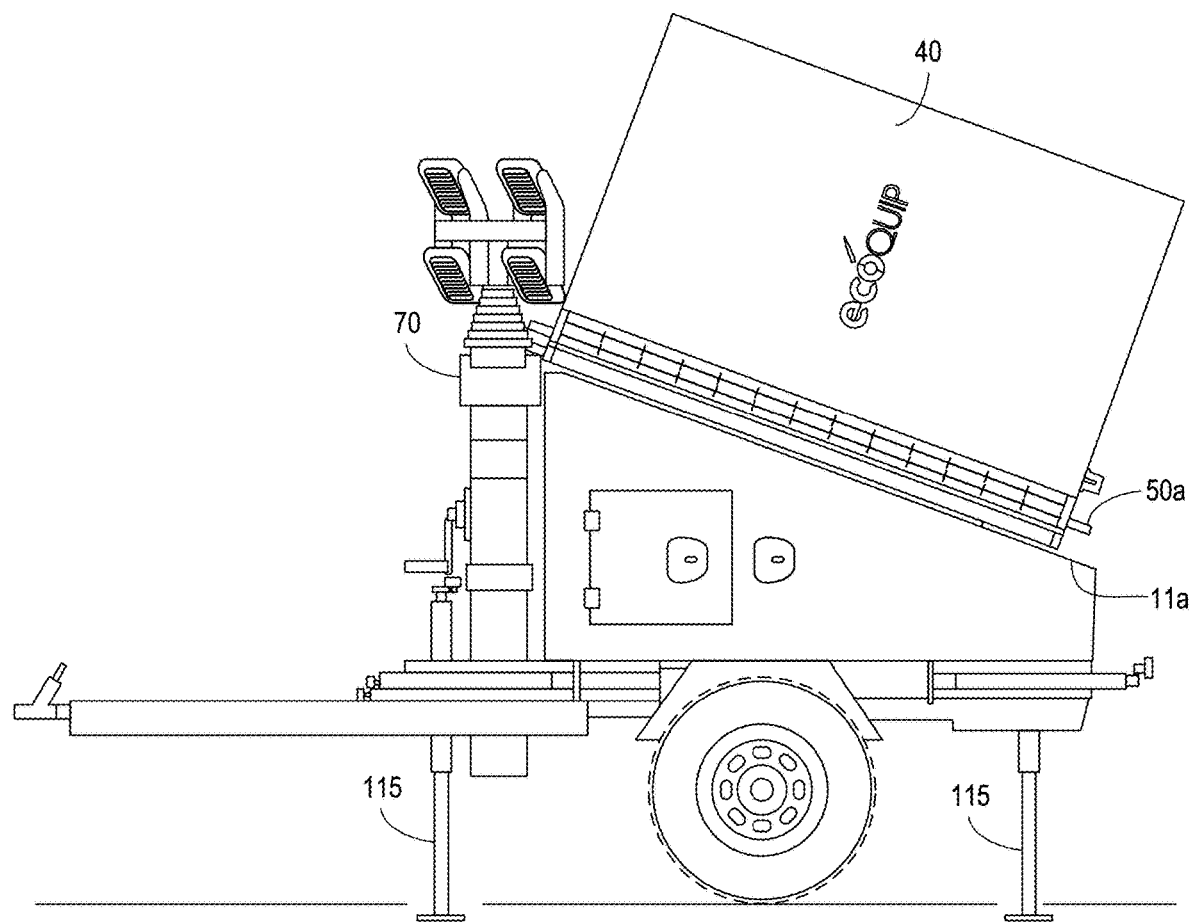
FIG. 5 is a schematic side view of the mobile solar panel unit of FIGS. 1 to 4 with an assembly of solar collector panels in transition between storage and deployed position.
Figure 6:
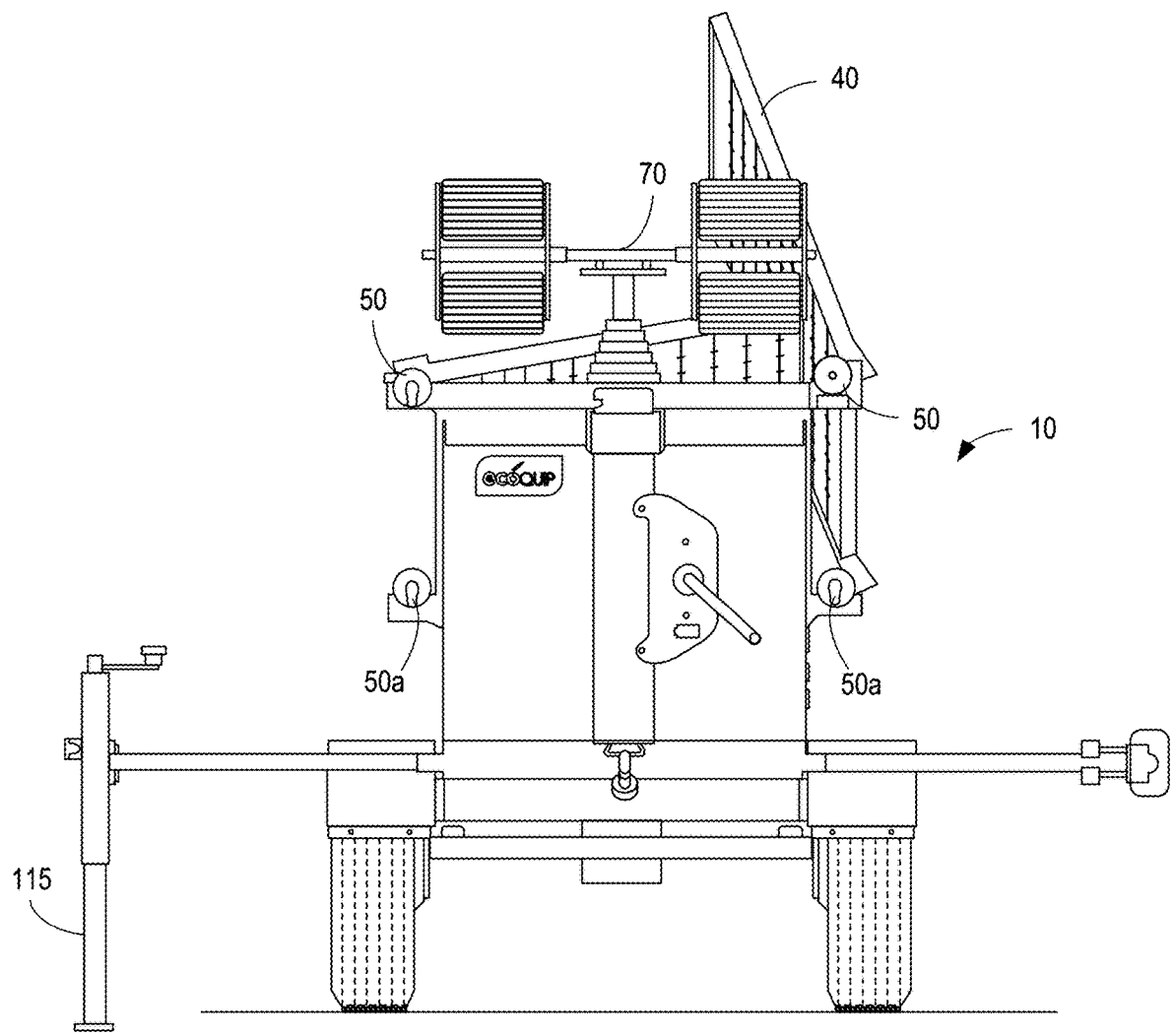
FIG. 6 is a schematic rear view of the mobile solar panel unit of FIGS. 1 to 5 with an assembly of solar collector panels in transition between storage and deployed position.
Figure 7:
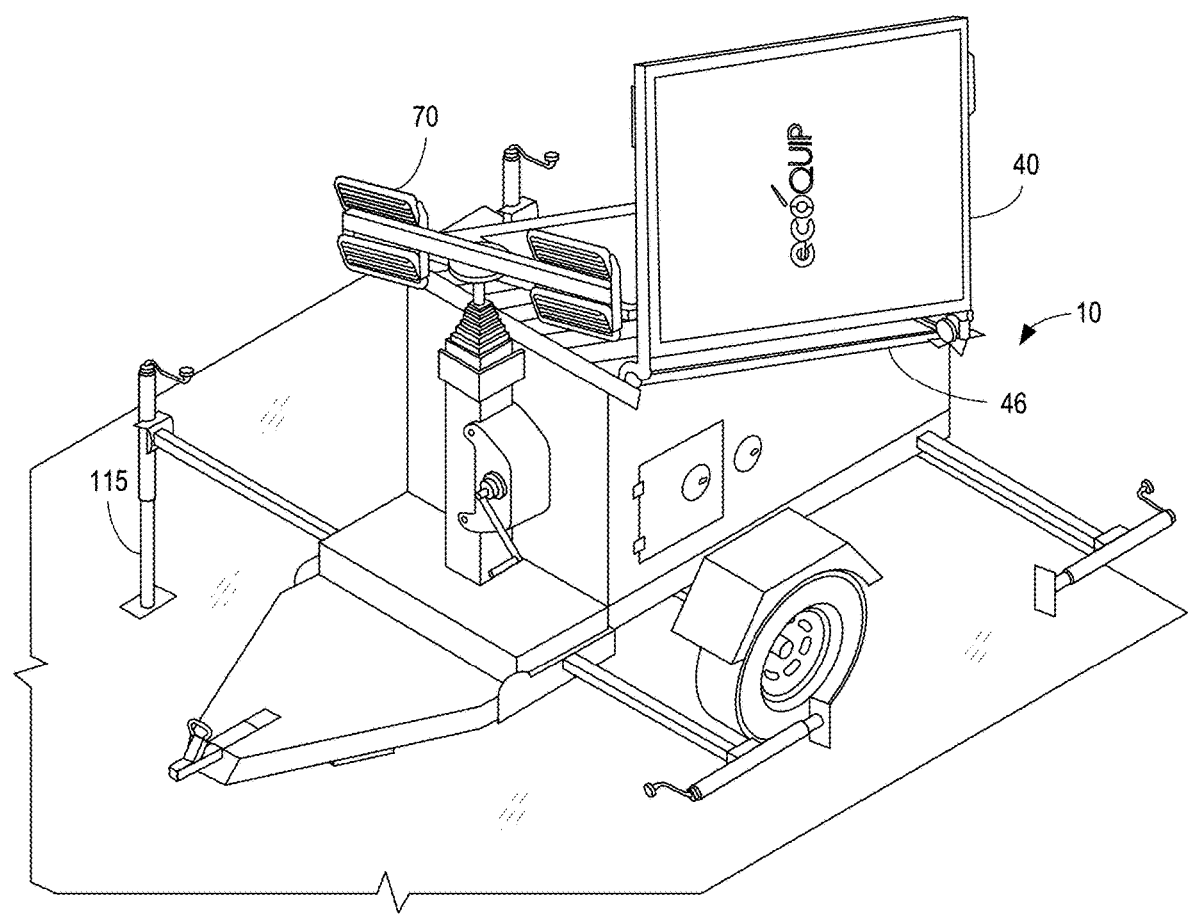
FIG. 7 is a schematic top view of the mobile solar panel unit of FIGS. 1 to 6 with an assembly of solar collector panels in transition between storage and deployed position.
Figure 8:
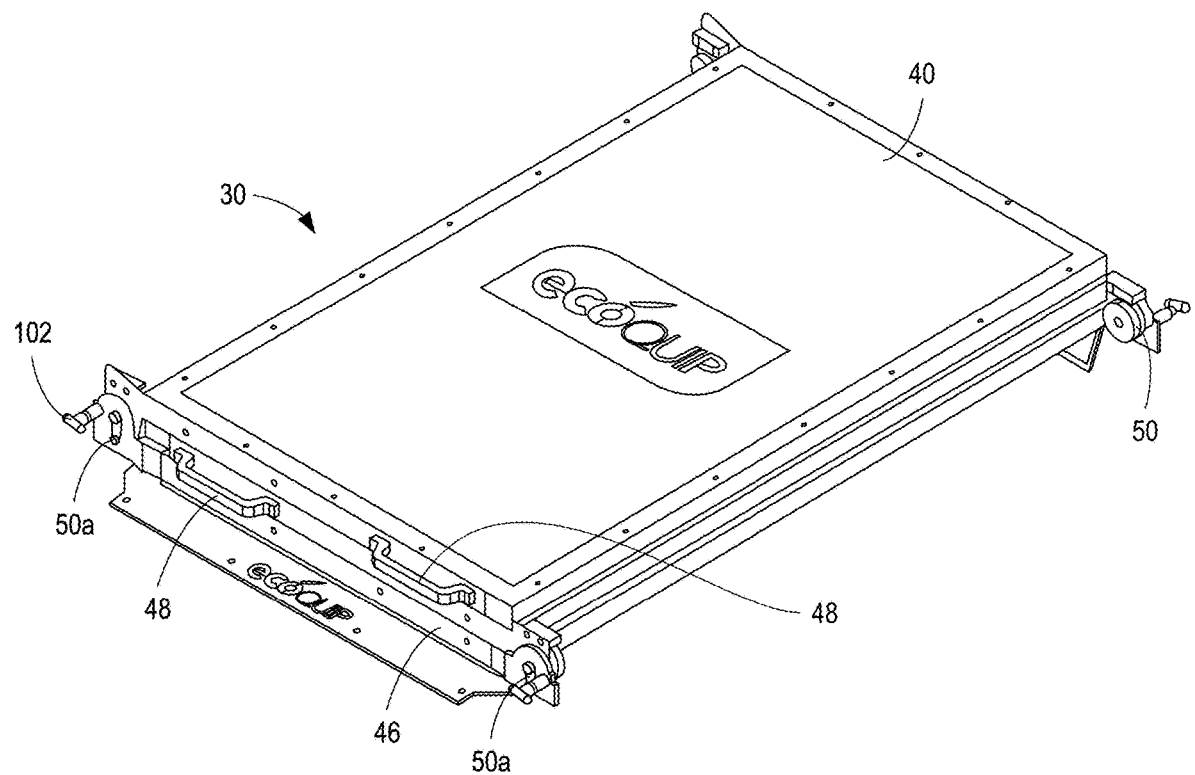
FIG. 8 is a schematic orthogonal view of the assembly of solar collector panels 1 to 7 in storage position.
Figure 9:
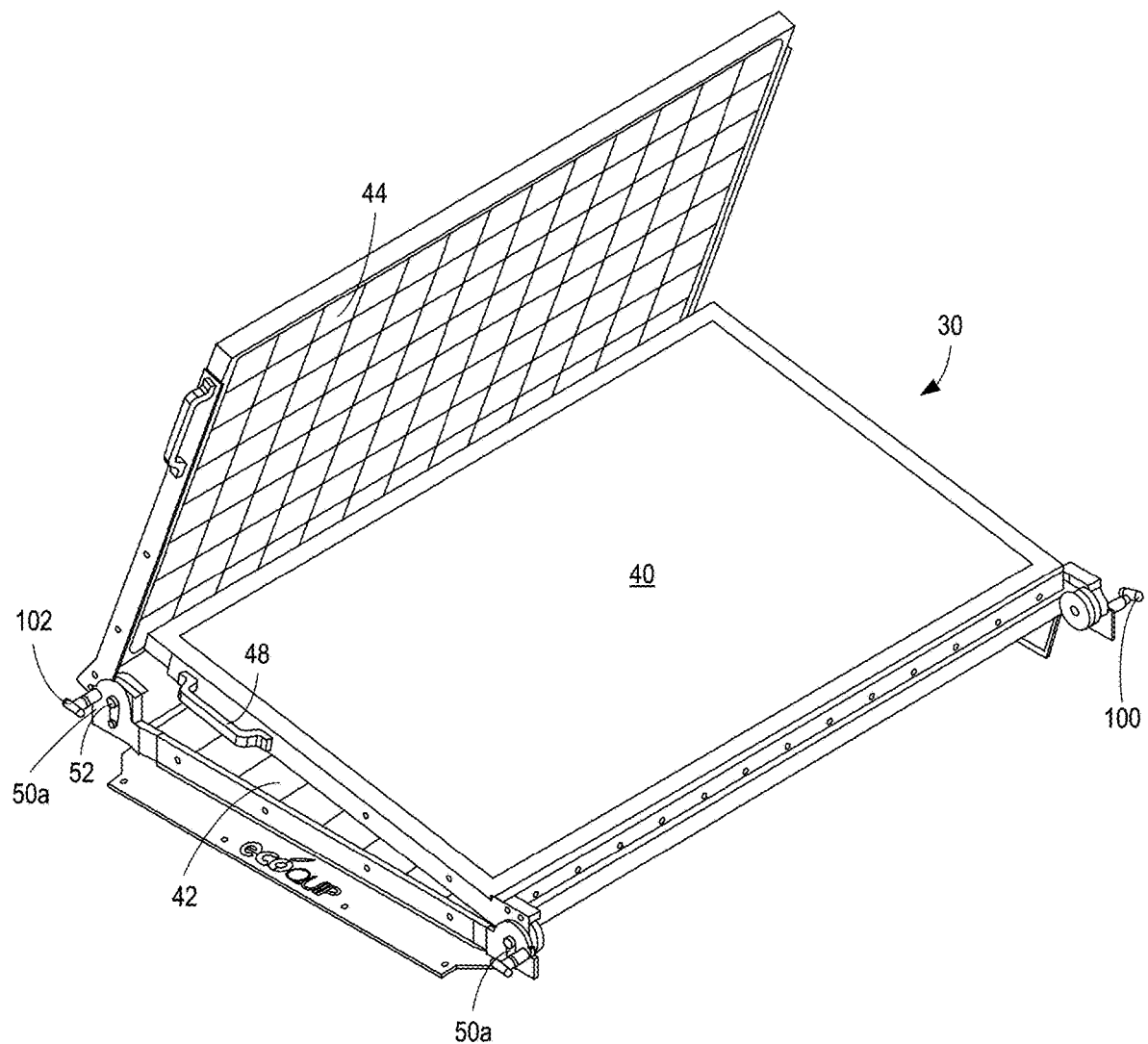
FIG. 9 is a schematic orthogonal view of the assembly of solar collector panels of FIGS. 1 to 8 in transition between storage and deployed positions.
Figure 10:
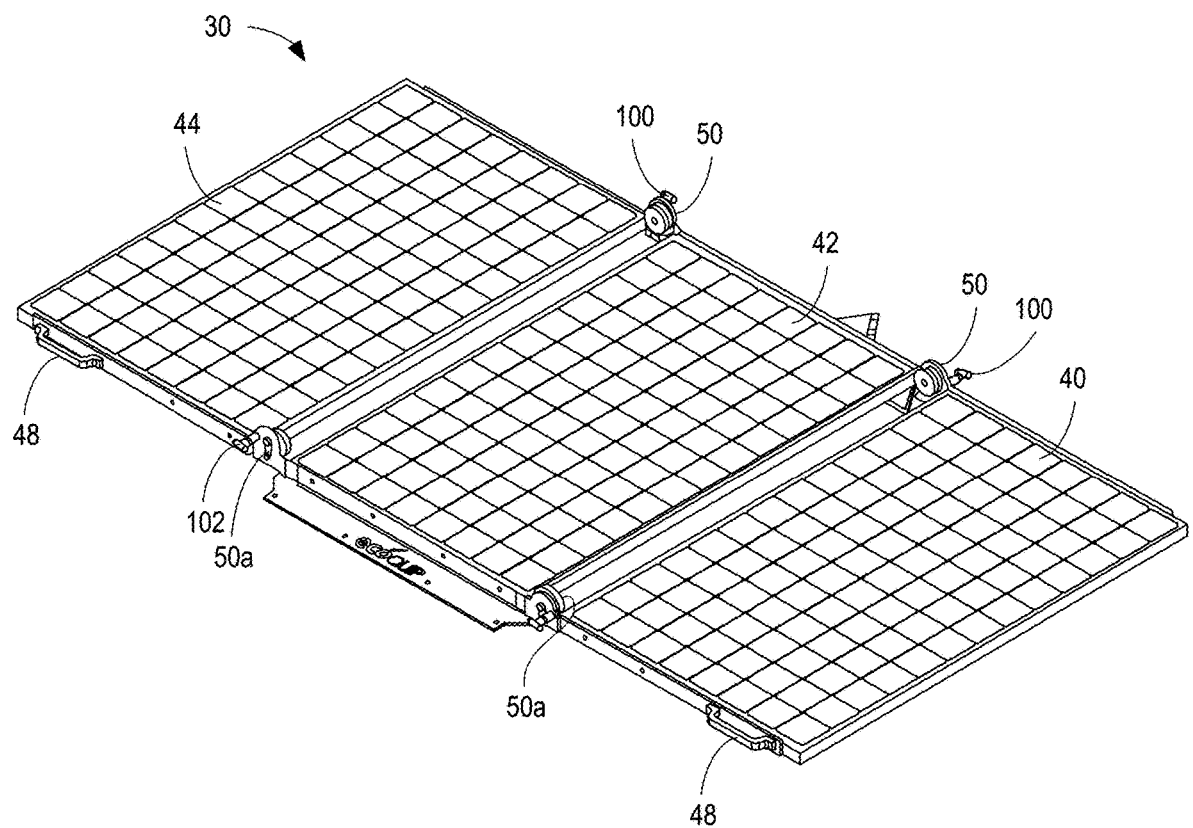
FIG. 10 is a schematic orthogonal view of the assembly of solar collector panels of FIGS. 1 to 9 in deployed position.
Figure 11:
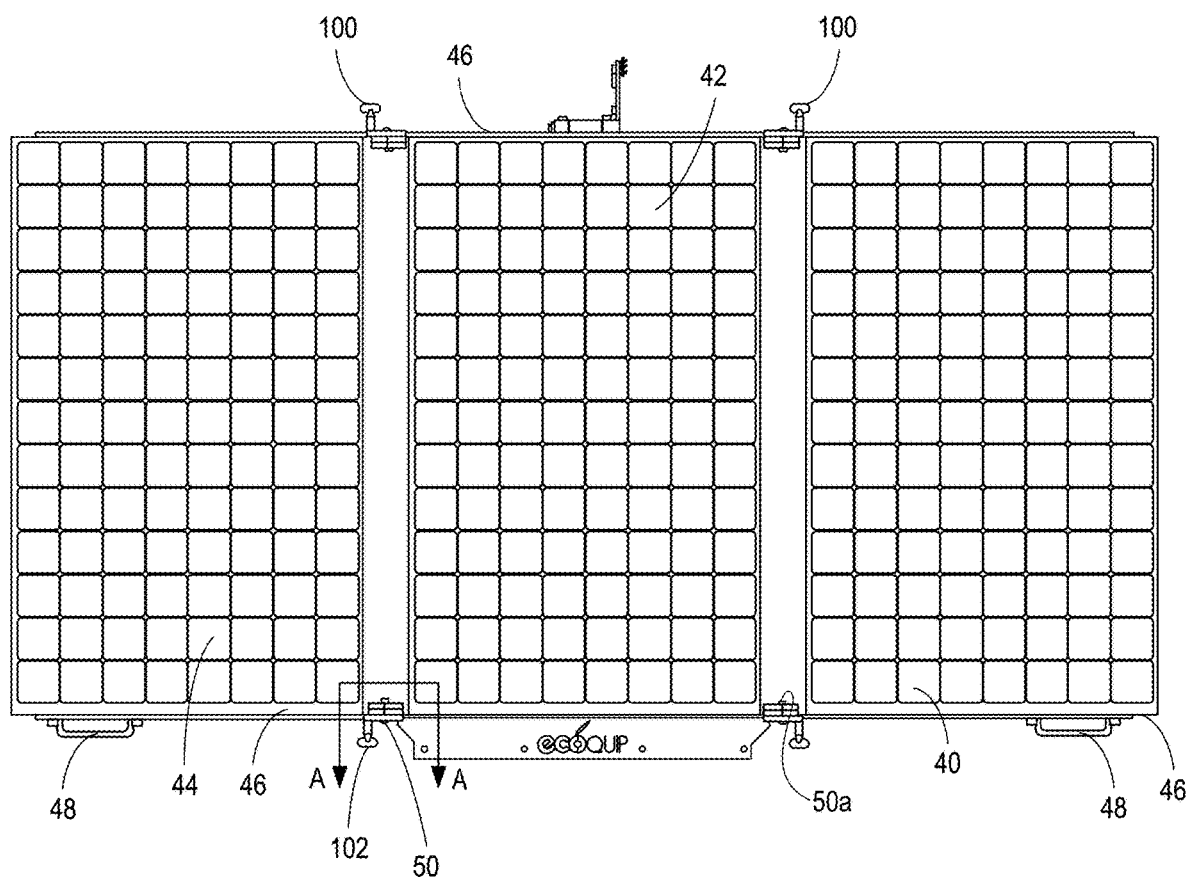
FIG. 11 is a top view of the assembly of solar collector panels of FIG. 10.
Figure 12:
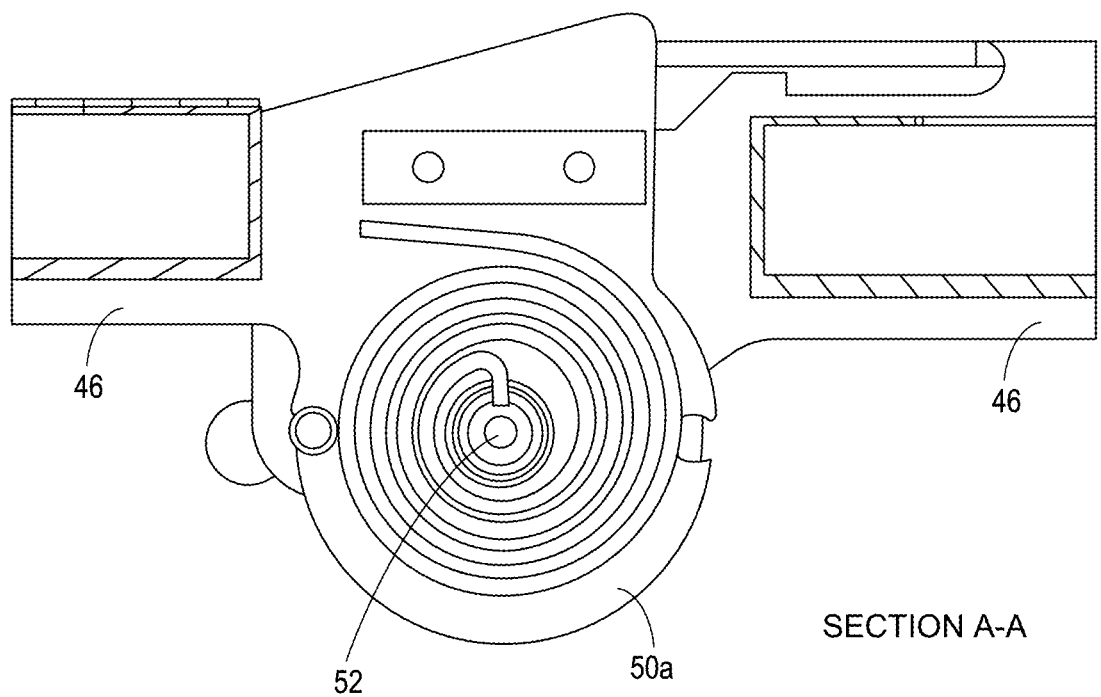
FIG. 12 is a side section view of a hinge connecting panels of the assembly of FIG. 11 along section A-A of FIG. 11.
Figure 13:
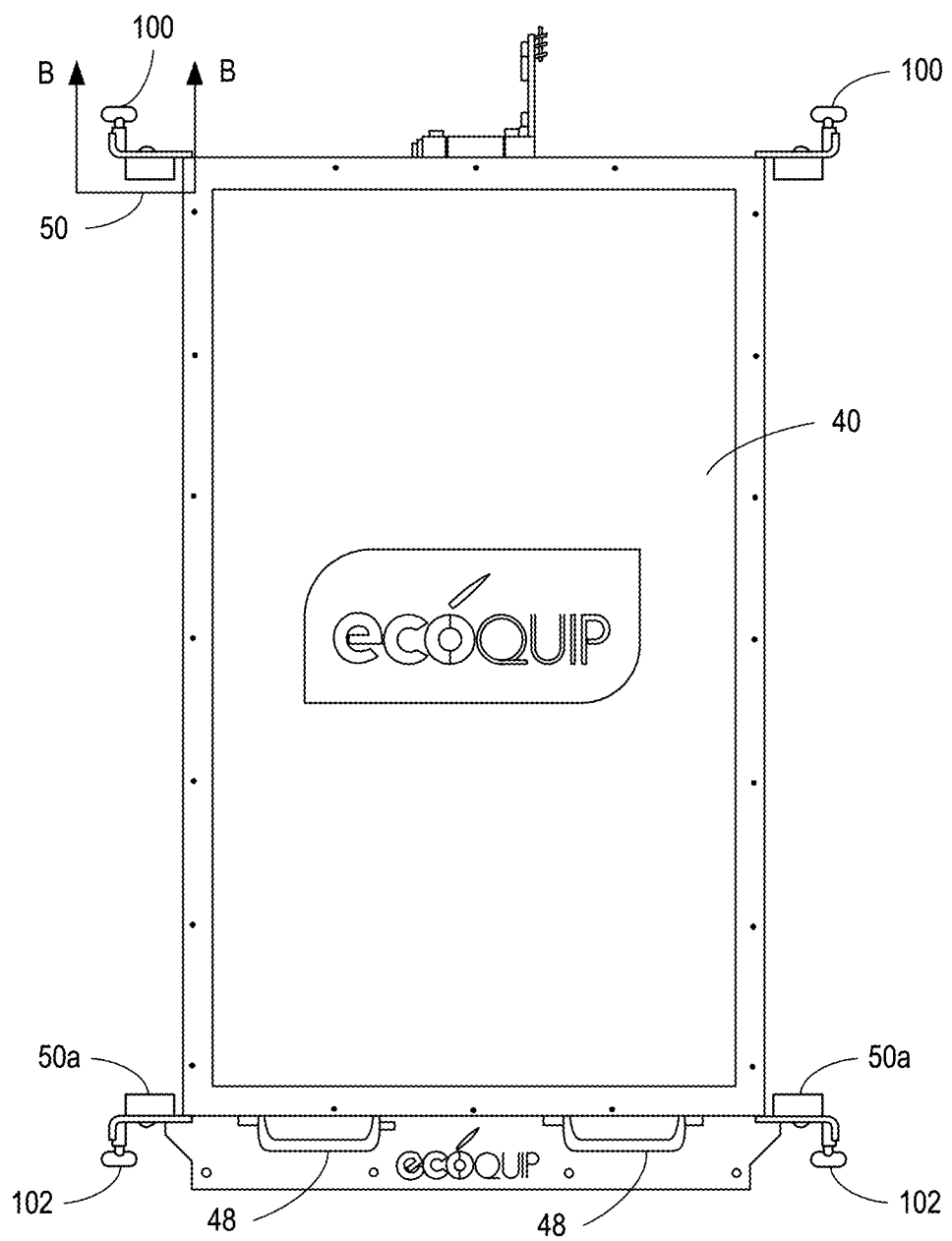
FIG. 13 is a top view of the assembly of solar collector panels of FIG. 8.

In a storage position, typically used for transportation of the solar panel unit 10 and as shown in FIGS. 1 and 2, the assembly 30 is locked into a closed position by a set of spring loaded locking pins 100 and 102, as conveniently shown in FIGS. 8, 11 and 13, locking pins 100 being located at the top of the stored assembly 30 and the other locking pins 102 being located at the bottom of the stored assembly 30.

Locking pins 100 and 102 are released from a locked position to an unlocked position by the operator. Then, taking the handle 48 of solar panel 40, the operator lifts the panel 40, which rotates about axles 52 at the top and bottom, until in the vertical position and then slowly guides the solar panel 40 down to the fully open or deployed position. The operator then secures locking pin 100 to lock the solar panel 40 in the deployed position. As the axles 52 are spring loaded, the operator will need to push the solar panel 40 down slightly to lock the panel into the fully open position. Locking pin 102 is configured to automatically engage with the locking position, popping into place as required.

The same process is applied to deploy solar panel 44. The solar panels 40, 42 and 44 are then ready to collect solar energy for conversion into electricity by conventional means known in the art to power the light mast 70. For example, the light mast 70 may include—in one embodiment— LED luminaires powered by DC current from an energy storage module in the form of a battery storage system being controlled by a control system for the mobile solar panel unit 10. A preferred control system is described in the Applicants Provisional Patent Application No. 2020904465, filed 2 Dec. 2020, the contents of which are hereby incorporated herein by reference.

When solar panels 40, 42 and 44 require to be stored or stowed, locking pins 100 are released at the top side of solar panels 40 and 44, each panel 40 and 44 being stowed in sequence. The operator then lifts each panel 40, 44 by handle 48 and raises it, with ease, through a transition between deployed and stored positions as illustrated by FIGS. 5 to 7 and 9. This transition includes a vertical neutral position at 90 degrees to the horizontal. The operator then slowly guides each solar panel 40, 44 down until closed. At the end of this operation, the solar panel assembly 30 is again in a stored position as shown in FIGS. 1, 2, 8 and 13. Top locking pins 100 are then re-engaged to lock the solar panel assembly 30 in the locked position.

The fold-out assembly 30 is configured to be readily deployed or stored by a single operator who can deploy and store solar panels with relatively little effort thanks to the spring assisted hinge mechanisms 50, 50a, together with locking pins 100, that inter-connect solar panels 40, 42 and 44 of the assembly 30. Physical effort may be as little as 3 kg to move the solar panels between stored and deployed positions and vice versa.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A mobile solar panel unit comprising:
   (a) a transport device having a housing including a load zone having a cross sectional area disposed on an upper inclined surface of the housing; and
   (b) a solar collector panel assembly of a plurality of inter-connected solar collector panels for providing, in use, power to an associated equipment item, said plurality of inter-connected solar collector panels being arranged in a stack on the upper inclined surface when in a stowed position;
   wherein any pair of adjacent solar collector panels in said solar collector panel assembly are inter-connected by a plurality of spaced hinges, said plurality of spaced hinges allowing rotation of a first panel of said pair of adjacent panels between said stacked stowed position and an adjacent deployed position extending laterally outward from the housing in which said pair of adjacent panels is disposed in a collection position to generate power when exposed to sunlight;
   wherein each hinge has a housing accommodating a spring assist mechanism providing a spring force to assist deployment and storage of panels of the solar collector panel assembly by providing a counter-balance to weight of a solar collector panel;
   wherein the spring assist mechanism includes a plurality of balancing springs, each said balancing spring being selected from the group consisting of a spiral spring and a coil spring;
   wherein said upper inclined surface has a fixed non-zero angle of inclination selected to increase solar energy collection by the deployed solar collector panel assembly at the mobile solar panel unit location with said plurality of inter-connected solar panels disposed in a same plane and supported by the housing of the transport device; and
   wherein said plurality of balancing springs has spring effort selected to act against the weight of the first panel of the pair of adjacent panels while enabling manual control of rotation of the first panel during a transition between stowed and deployed positions.

2. The mobile solar panel unit of claim 1 including locking pins, to secure said panels into the deployed position.

3. The mobile solar panel unit of claim 2, wherein a set of locking pins are provided for each panel and moved between locked and unlocked positions during deployment or storage.

4. The mobile solar panel unit of claim 3, wherein the set of locking pins includes a pair of locking pins, one locking pin being lockable whilst the other locking pin is unlocked.

5. The mobile solar panel unit of claim 4, wherein said locking pins operate automatically.

6. The mobile solar panel unit of claim 1, wherein said associated equipment item is a light mast or communications tower.

7. The mobile solar panel unit of claim 1, wherein said associated equipment item forms part of a trailer.

8. A solar collector panel assembly comprising a plurality of inter-connected solar collector panels for providing, in use, power to an associated equipment item, said plurality of inter-connected solar collector panels being arranged in a stack when in a stowed position on a load zone having an inclined surface;
   wherein any pair of adjacent solar collector panels in said assembly of solar collector panels are inter-connected by a plurality of spaced hinges, said plurality of spaced hinges allowing rotation of a first panel of said pair of adjacent panels between said stacked stowed position and an adjacent deployed position extending laterally outwardly of the load zone in which said pair of adjacent panels is disposed in a collection position at a fixed angle of inclination being a non-zero angle selected to increase solar energy collection and to generate power when exposed to sunlight;
   wherein each hinge has a housing accommodating a spring assist mechanism providing a spring force to assist deployment and storage of panels of the solar panel collector assembly by providing a counter-balance to weight of a solar collector panel;
   wherein the spring assist mechanism includes a plurality of balancing springs, each said balancing spring being selected from the group consisting of a spiral spring and a coil spring; and
   wherein said plurality of balancing springs has spring effort selected to act against the weight of the first panel of the pair of adjacent panels while enabling manual control of rotation of the first panel during a transition between stowed and deployed positions.

9. The assembly of claim 8 including locking pins to secure said panels into the deployed position.

10. The assembly of claim 9, wherein a set of locking pins are provided for each panel and moved between locked and unlocked positions during deployment or storage.

11. The assembly of claim 10, wherein a set of locking pins includes a pair of locking pins, one locking pin being lockable whilst the other locking pin is unlocked.

12. The assembly of claim 11, wherein said locking pins operate automatically.

13. The assembly of claim 8, wherein a pair of the balancing springs is accommodated in a stack within the housing of each hinge.

14. The mobile solar panel unit of claim 1, wherein the non-zero angle is selected based on a position of the solar collector panel assembly relative to the sun.

15. The mobile solar panel unit of claim 1, further including at least two pairs of adjacent panels.

16. The solar collector panel assembly of claim 8, further including at least two pairs of adjacent panels.

17. The mobile solar panel unit of claim 1, wherein said balancing springs have characteristic selected to provide a neutral position of the first panel.

18. The mobile solar panel unit of claim 17, wherein said neutral position is a vertical neutral position at 90 degrees to the horizontal.

19. The solar collector panel assembly of claim 8, wherein said balancing springs have characteristic selected to provide a neutral position of the first panel.

20. The solar collector panel assembly of claim 19, wherein said neutral position is a vertical neutral position at 90 degrees to the horizontal.

* * * * *